United States Patent [19]

Kauzlarich et al.

[11] Patent Number: 5,090,464
[45] Date of Patent: Feb. 25, 1992

[54] MAINTENANCE-FREE VEHICLE AND CART TIRE

[75] Inventors: James J. Kauzlarich, Charlottesville, Va.; Colin Metherell, Hertford, United Kingdom

[73] Assignees: The University of Virginia Patents Alumni Foundation, Charlottesville, Va.; The Malaysian Rubber Producers Research Association, Hertfordshire, United Kingdom

[21] Appl. No.: 535,157

[22] Filed: Jun. 8, 1990

[30] Foreign Application Priority Data

Jun. 8, 1989 [GB] United Kingdom ............... 8913202

[51] Int. Cl.$^5$ .................. B60C 07/00; B60C 07/24
[52] U.S. Cl. .................... 152/310; 152/327
[58] Field of Search ............ 152/209, 246, 310, 323, 152/327, 328, 329, 339.1, 340.1, 311, 312

[56] References Cited

U.S. PATENT DOCUMENTS

| 1,435,566 | 11/1922 | Vandereey et al. | 152/339.1 |
|---|---|---|---|
| 1,466,133 | 8/1923 | Lundstrom . | |
| 1,612,294 | 12/1926 | Krepokavich | 152/329 |
| 2,345,068 | 3/1944 | Pfeiffer | 152/265 |
| 3,062,254 | 11/1962 | Keefe | 152/323 |
| 4,033,395 | 7/1977 | Berg | 152/323 |
| 4,493,355 | 1/1985 | Ippen | 152/329 |
| 4,514,243 | 4/1985 | Moore | 156/113 |

FOREIGN PATENT DOCUMENTS

| 7226702 | 3/1973 | France . | |
|---|---|---|---|
| 0566255 | 8/1957 | Italy | 152/323 |
| 0022763 | of 1912 | United Kingdom . | |
| 2191452A | 12/1987 | United Kingdom . | |

OTHER PUBLICATIONS

"Carefree Cycling with Carefree Tires", *Rubber Developments*, vol. 27, No. 1, 1974.

Primary Examiner—John J. Gallagher
Assistant Examiner—Nancy T. Krawczyk
Attorney, Agent, or Firm—Kerkam, Stowell, Kondracki & Clarke, P.C.

[57] ABSTRACT

A maintenance-free, non-pneumatic rubber tire for wheels of slow-moving vehicles such as wheelchairs, push-chairs and carts has a base (14) a rim (15), side walls (13) and a tread (11) of generally constant thickness along the width of the tire. The central region of the tire has one or two continuously annular empty space(s) (16) dimensioned to control the spring constant of the tire to a desired value. The tire also contains reinforcement e.g. in the form of a layer of cord (17) or spiral wire.

10 Claims, 2 Drawing Sheets

MAINTENANCE-FREE VEHICLE AND CART TIRE

BACKGROUND OF THE INVENTION

This invention relates to maintenance-free, non-pneumatic vehicle and cart tires, particularly intended for wheelchairs, pushchairs, tricycles, bicycles, trollies, carts, and gurneys.

Non-pneumatic tires offer important maintenance advantages over pneumatic tires. With non-pneumatic tires there is no need to check and adjust air pressure and there is never a worry about a flat or punctured tire, thus avoiding these common inconveniences encountered when using pneumatic tires. Especially for persons using wheelchairs, surveys show that tires are the biggest repair problem for all kinds of wheelchairs, see "Wheelchair III: Report of a Workshop" Bethesda, Md.: Rehabilitation Engineering Society of North America, 1982.

Solid and foamed rubber tires, which do not contain air under pressure, do not become dysfunctional when punctured. Here, the use of the word 'rubber' is intended to cover that group of materials which has the ability to undergo large deformations and to recover quickly. However, solid rubber tires are extremely heavy, with a high rolling resistance, and have a very high spring constant, giving an uncomfortable ride. Foamed rubber tires offer improvements over solid rubber tires but are prone to cutting and destruction by fatigue failure due to the very low fatigue strength associated with foamed materials: Atkins, A. G., and Y-W Mai, 'Elastic and Plastic Fracture', E. Horwood Ltd., 1985, (p. 799).

All conventional tires, including standard pneumatic tires, are made in standard vulcanizing moulds, and a special mould is required for each size of tire. In addition, there are expensive complications in the moulding process such as mould cores and reinforcement materials being required.

U.S. Pat. No. 4,493,355 issued to Ippen et al., and assigned to Bayer Aktiengesellschaft, (hereafter: 'the Bayer patent') discloses a 'puncture-proof' tire consisting essentially of a single vulcanisable material and comprising a tread thicker than the side walls, a continuous encircling empty space between the base and the tread, with the moment of inertia of the latter being at least six times greater than that of the side walls, and an encircling annular reinforcement of plastics material in the base, hardened after the tire is fitted on the rim of the wheel. This invention suffers from the disadvantages, inter alia, it is not possible to remove the tire from the rim, and this is inconvenient; that the maximum stresses in the tire material that may occur in practice are too high to give a satisfactorily long fatigue life; that its spring constant appears to be too low to cope with sudden very large deflections, i.e. on impact; and that it requires an extra (and, as will be demonstrated below, unnecessary) manufacturing step of introducing a hardenable plastics material.

Moreover, we have established that the Bayer patent is using oversimplified criteria for a very complicated problem. The moment of inertia ratio is calculated as follows. Assuming the load carried over a length of tire is b, the two moments of inertia I are given by: $I_{tread}=(1/12)b\ h_t^3$ and $I_{side\ wall}=(1/12)b\ h_{sw}^3$, where t stands for tread, sw stands for side wall, and h for height (thickness).

Thus, $I_t/I_{sw}=h_t^3/h_{sw}^3$. For the Bayer patent design $h_t=11$ mm, and $h_{sw}=6$ mm; then, $$I_t/I_{sw}=11^3/6^3=6.16.$$

The Bayer patent criterion ($I_t/I_{sw}>6$) would suggest that the maximum stress under load would be similar for the tread region and the side wall region.

The Bayer patent's criterion, I(tread)/I(side wall)>6, is related to the concept that the arching type cross-section acts like a bridge in bending, and to have the same bending stress everywhere in the arch requires that the thickness of the arch increase towards the top of the arch where the load is applied. Thus, $I_t$ must increase in comparison to $I_{sw}$.

However, this ratio is not a required criteria for tire design. For example, one could let the side wall be 1 mm thick and still require $I_t/I_{sw}>6$, but the tire would collapse under load.

We have discovered that it is not necessary to require $I_t/I_{sw}>6$ for a satisfactory design. Using $I_t/I_{sw}>1$ we were able to design the tire so that the maximum stress in the tire did not exceed the fatigue stress limit for long life.

For good tire design one must consider all of the physical phenomena involved: 1. contact stress theory, 2. thick walled cylinder theory, 3. rubber stress-strain properties, and 4. fatigue theory. In addition, one must consider a great number of other variables associated with compounding rubber. For example, the amount of wax to introduce into the compound is very important, etc. One method which we have used is the finite element analysis approach to tire design. This method takes into account most of the physical theory involved. Our results show that the Bayer criterion is not a real requirement for good design, and we find that $I_t/I_{sw}>1$ will produce well designed tires.

AIMS OF THE INVENTION

An aim of the present invention is to provide a tire for vehicles and carts, particularly for wheelchairs and pushchairs, which does not lose its load-bearing capacity even in the event of punctures and/or other minor damage such as small cuts or nicks to the tire, and moreover has very good cushioning properties, as measured by its low spring constant.

Another aim of the invention is to provide a tire which will maintain its position on the rim of the wheel under all operating conditions but which is removable, if desired.

A further aim of the invention is to provide a tire construction wherein appreciable weight and material can be saved by maintaining at a value the ratio of the moments of inertia of the tread and of the side walls substantially lower than in the prior art, e.g. between 0.75-3.0, and wherein the maximum stresses in the tire material are low for long service life.

In addition, yet another aim of the invention is to employ modern mass-production techniques, such as extrusion of the cross-section, curing, cutting to length and joining the ends together to produce a tire of any size appropriate for the rim of the wheel, using dies which are easier and simpler to fabricate.

Still another aim of the invention is to provide a tire which can take overloads or side loads without deforming in an unstable fashion.

Accordingly, one aspect of the present invention provides a non-pneumatic tire comprising a base for attachment to a vehicle wheel rim, side walls and a tread merging with one another, wherein:
  (a) the tire includes at least one continuous encircling empty space between the said base and the said tread;
  (b) the size of the said encircling empty space(s) is selected so as to result in a tire wall thickness providing a spring constant similar to conventional tires;
  (c) the said tire contains reinforcing means to maintain the position of the tire on the wheel under substantially all operating conditions; and wherein the improvement consists in that.
  (d) the said tread and side wall are of generally constant thickness along any radius of the tire cross-section.

According to another aspect of the invention, there is provided a non-pneumatic tire comprising a base for attachment to a vehicle wheel rim, side walls and a tread merging with one another, wherein:
  (a) the tire includes at least one continuous encircling empty space between the said base and the said tread;
  (b) the size of the said encircling empty space(s) is selected so as to result in a tire wall thickness providing a spring constant k in the range of 100-200 N/mm,
  (c) the said tire contains reinforcing means to maintain the position of the tire on the wheel under substantially all operating conditions;
  (d) the ratio of the moment of inertia of the said tread to that of the said side walls is substantially 0.75-3.0.

By 'non-pneumatic' tire is meant a tire that may or may not have at least one air-filled cavity in which the air in said cavity is essentially at atmospheric pressure, i.e. not pressurized; and the tire does not have a valve or other device to allow air under pressure to be introduced into the said cavity.

The preferred material for the tire is one which has the ability to undergo large deformations and to recover quickly. Natural and synthetic rubber, and other rubber-like polymers, unfilled or filled with reinforcing materials, are candidate materials for use in the tires according to the invention.

The tread of the tires may be smooth or may be provided with profiles. It is preferable that the profiles, such as beads or grooves, be continuous over the periphery of the tire, applied e.g. by an embossing tool, as is well-known in the extrusion art. In the case where the tire is extruded and then moulded it is understood that any process known to the art may be applied for producing treads or embossing tires.

Preferably, there are two encircling empty spaces in the tire, the spaces being juxtaposed across the width of the tire such that a rib extending in the direction from the base to the tread is formed therebetween, the dimensions of said spaces being selected such that the height and width of said rib are effective to produce a tire with a low spring constant, preferably below 200 N/mm.

In principle, the one or two encircling empty spaces between the base and tread may be of any cross-sectional shape. The preferred shape of the one or two empty space(s) is, however, circular as being the shape that will minimize fatigue failure of the material; it is well-known that sharp corners are sites for stress concentration leading to early fatigue failure.

It is desirable to have a spring constant k for the tire that is similar to that of a pneumatic tire, of the order of 100-200 N/mm, most preferably k=130 N/mm, as it has been shown that the low spring constant of a pneumatic tire gives the most comfortable ride: Gordon, J., Kauzlarich, J. J. and Thacker, J. G. 'Tests of Two New Polyurethane Foam Wheelchair Tires', Journal of Rehabilitation R & D, V. 26, No. 1, 1989, pp. 33–46.

DESCRIPTION OF THE DRAWINGS

Preferred embodiments of tires according to the invention are described below, purely by way of example, with reference to the accompanying drawings, wherein.

DESCRIPTION OF THE PREFERRED EMBODIMENTS

Throughout the description the same reference numbers have been used to designate the same or functionally equivalent parts.

Figure 1:
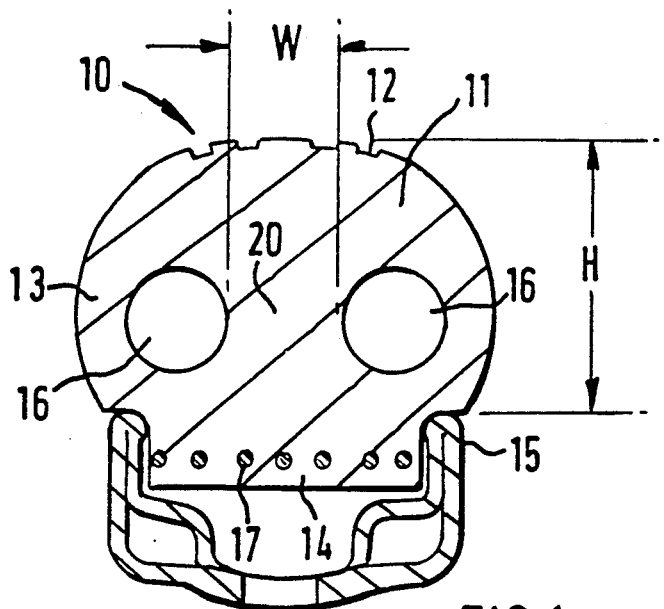
FIG. 1 is a cross-section through a press-fitted tire according to a first embodiment of the invention.

Referring first to FIG. 1, a cross-section through a tire 10 for a slow-moving vehicle (wheelchair, cart) that has been press-fitted to the rim of a wheel is shown. The tire 10 has a tread 11 which is essentially of constant cross-section or thickness across the width of the tire 10. It is preferably provided with profiles 12 and is connected by way of side walls 13 to the base 14 of the tire adapted to the contour of the rim 15 of a wheel. The height of the tire 10 from the tread 11 to rim 15 is designated by H.

The body of the tire 10 contains two circular encircling cavities or empty spaces 16 which, in this example, are juxtaposed in a widthwise spaced apart, parallel relationship to form a rib 20 therebetween. Their function is to control the spring constant of the tire by establishing the effective width W of the centrally located vertical rib 20 of the tire. The relation between the height H of the tire and the width w of the rib, along with the appropriate modulus of elasticity of the rubber according to equation (1), see below, can be adjusted to optimize the spring constant to a low value, preferably 100-200 N/mm. One or more layers of cord or spiral wire (or other reinforcing means) 17 serve to reinforce the tire so as to prevent disengagement of the tire 10 with the rim 15 under operating conditions. The ratio of the moment of inertia of the tread 11 to that of the side walls 13 is generally in the range of 0.75 to 3.0, most preferably close to unity.

Figure 2:
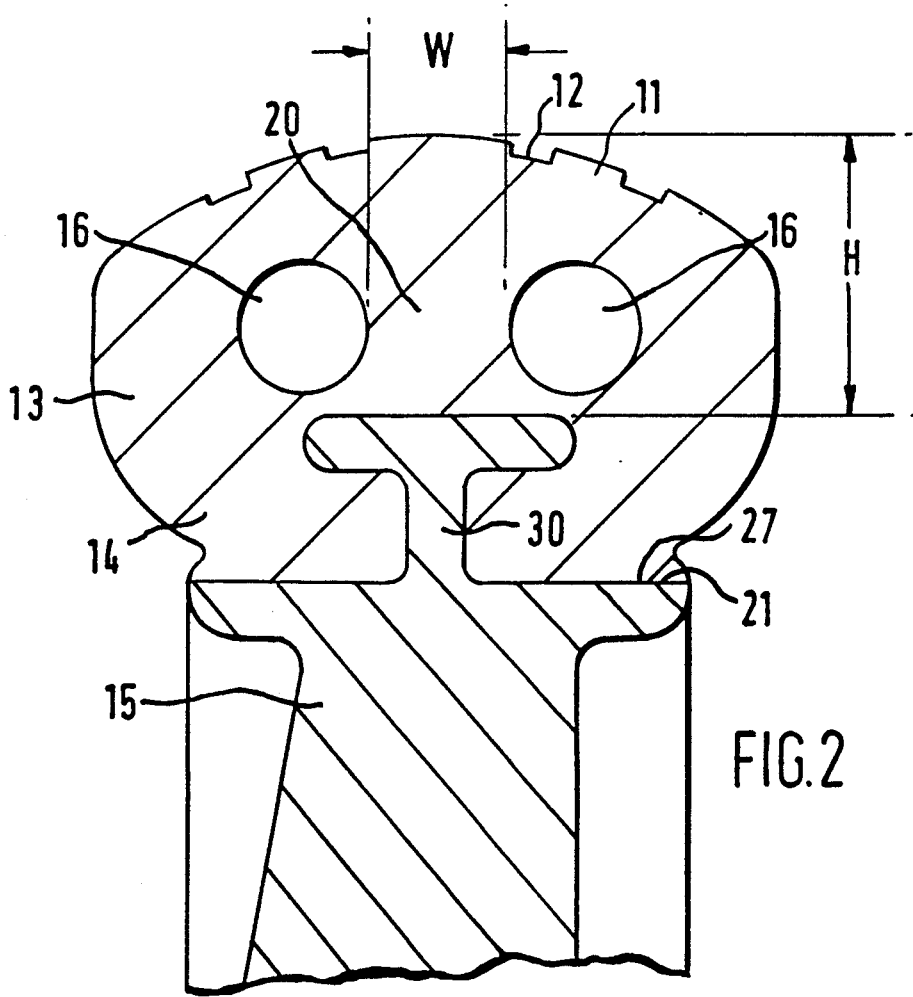
FIG. 2 is a cross-section through a tire according to a second embodiment of the invention in which the base of the tire is joined to the wheel rim.

FIG. 2 is a cross-section of another preferred tire joined to the rim 15 of a wheel the tire-rim interface 21. In FIG. 2 the cords or spiral wire 17 (or other reinforcing means) are omitted and the base 14 of the tire is joined to an extension 30 of the wheel rim 15 by any suitable method of attaching rubber to metal or plastic; the joining methods may or may not involve vulcanization processes and are well-known to the tire industry, e.g. 'Chemlock' bonding agents.

Again, the tire includes two encircling empty spaces 16 placed to ensure a comfortable ride by controlling the height (H) to rib width (W) ratio in accordance with equation (1), see below. In this embodiment, H is measured from the tread 11 to the nearest point of the base, namely to the proximate surface of the flange 30. The joint between the tire and wheel rim contains a lip 27 to reduce the joint stress at the rim and tire joint.

In the preferred embodiments of the invention shown in FIGS. 1 and 2, the spring constant k for the tire is found to obey approximately the following simple equation derived from the theory of strength of materials:

$$k = E \times A/H = k_o \times E \times W/H \qquad (1)$$

where E is modulus of elasticity of the material, preferably rubber, A is the effective loaded cross-sectional area of the vertical rib 20, H and W are as before, and $k_o$ is a coefficient depending upon the particular embodiment of the invention.

In the case of FIG. 1 the value of $k_o$ is found to be of the order of 75 mm, and for FIG. 2 $k_o$ is of the order of 70 mm. Thus, using equation (1) it is possible to predict the effect on the spring constant (k) of changing the modulus of elasticity, E, of the rubber, for example. The properties of the rubber have been selected so that the design variables are optimized as to spring constant as well as other desirable tire characteristics.

Figure 3:
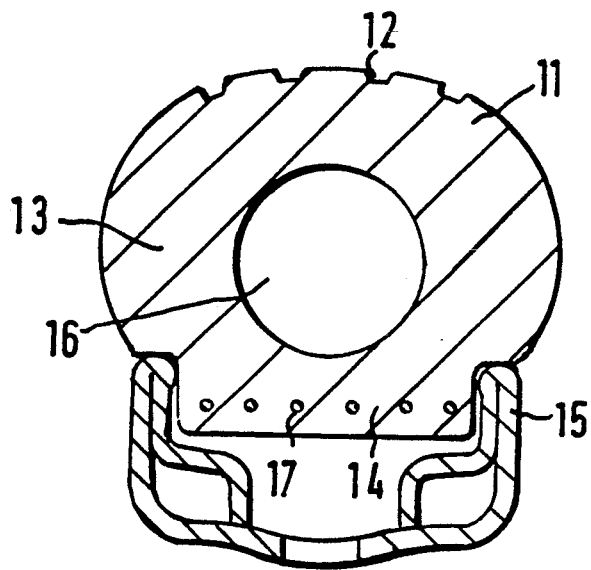
FIG. 3 is a cross-section through a tire according to another preferred embodiment of the invention.

FIG. 3 is a cross-section of another preferred tire including a single, central encircling empty space (16) effective to control the side wall thickness so that the spring constant of the tire will be low and the tire gives a cushioned ride. One or more layers of cord 17, spiral wire or other reinforcing means serve to reinforce the tire. Whilst for high vertical and side loads the embodiments of the invention using two encircling empty spaces and shown in FIG. 1 and FIG. 2 are preferred, the embodiment of the invention according to FIG. 3 is primarily applicable to wheelchairs and pushchairs where the vertical and side loads are less severe. The side wall thickness must not be too thin so as to cause high stresses in the material or collapse under loads.

As in the previous preferred embodiments of the invention, so also in the FIG. 3 embodiment with its single encircling empty space 16, finite element analysis of the complicated Hertz stresses and consideration of thick-walled shell stresses are required to design the wall thickness of the tire so that the beneficial low spring constant is achieved while maintaining sufficiently low stresses due to loads so as to avoid early fatigue failure of the material. Where large side loads are encountered the tire design with two encircling empty spaces 16 is required for stability of the structure, see Kauzlarich, J. J.: "FEA of Solid Rubber Wheelchair Tires", Proc. of Contact Analysis Meeting, Inst. of Physics Short Meeting Series No. 25, London 1990, pages 15–22.

As shown in FIG. 3, the tread and side wall are of constant thickness along any radius (i.e., from center of empty space 16) of the tire cross-section.

With the embodiments having two encircling empty spaces 16, i.e. FIG. 1 and FIG. 2, the side walls 13 act to support the central vertical encircling rib 20 of the tire. The action of the side walls 13 is somewhat analogous to that of the flying buttresses of a classical European cathedral, in that the side walls 13 are abutments for the central rib 20 of the tire and are thus especially effective in stabilizing the tire against overloads and side forces.

The base 14 of the tire itself is adapted in its shape to the contour of the rim of the wheel. When the base 14 of the tire is not joined to the wheel rim the base of the tire contains cords or spiral wire 17 (or other reinforcing means) joined to the material of the tire, and the cords or spiral wire 17 as reinforcement to prevent the tire from detaching from the rim under operating conditions. Alternatively, the cords or spiral wire 17 could be located in the encircling empty spaces 16 of the tire and the cords or spiral wire would be tied before joining the ends of the extrusion to form a tire.

In principle, any cord, spiral wire or other reinforcing means that makes a bond with the rubber may be used as reinforcement in the base of the tires which are designed to be press-fit to the rim of the wheel (cf. FIG. 1 and FIG. 3). For cord, spiral wire or other reinforcing means inserted in the encircling empty spaces and tied with a knot it is not necessary that the cord, wire or other reinforcing means are bonded to the rubber.

The production of tires according to the invention is simplified by comparison with conventional pneumatic tires because such tires are particularly amenable to production by extrusion and vulcanization of the properly shaped cross-section of the tire, including (for the FIG. 1 and FIG. 3 embodiments) cord, spiral wire or other reinforcing means, and tread patterns. Accordingly, the economic saving with respect to producing pneumatic tires is considerable.

DESCRIPTION OF MATERIALS

The tires according to the invention may be made of any natural or synthetic rubber having the following desirable characteristics. The material is selected to:

(a) minimize the wear;

(b) minimize compression set;

(c) minimize hysteresis losses;

(d) maximize fatigue strength;

(e) give satisfactory extrusion and moulding characteristics;

(f) make no tire marks to a floor (where required), and (g) minimize cost.

Optimizing all of the above factors has been accomplished by using the following rubber mixture:

Polymer Natural rubber (NR) synthetic rubbers such as polyisoprene, styrene-butadiene rubber or polybutadiene or Superior Processing (SP) rubbers or blends of those polymers.

SP rubbers are a special type of natural rubber made from mixtures of pre-vulcanized latex and normal latex which are subsequently processed similarly to conventional NR. Typical market grades include SP20, SP40, SP50, PA80. The numeral indicates the percentage of pre-vulcanized latex. SP rubbers may be blended with other grades of NR or synthetic rubber. Improvements in extrusion characteristics are observed when SP rubbers are incorporated in the mix.

Suggested composition ranges:

| Polymer as defined above | 100 |
|---|---|
| Non-black filler[1] | 30–60 |
| Rubber-filler coupling agent[2] | 0–6 |
| Process aid[3] | 0–5 |
| Zinc oxide | 1–10 |
| Stearic acid | 0–5 |
| Antioxidant, non-staining[4] | 0–3 |
| Wax | 0–10 |
| Biocide[5] | 0–3 |
| Antistatic agent[6] | 0–20 |
| Whitening agent | 0–20 |
| Accelerator[8] | 0.3–4.0 |
| Sulphur | 0–4 |

-continued

| Silica activator[9] | 0–3 |
|---|---|

[1] e.g. precipitated silica
[2] e.g. Triethoxysilylpropyl tetrasulphide, such as SI69 (Degussa)
[3] e.g. Struktol WB16 (Schill & Seilacher)
[4] e.g. Wingstay L (Goodyear)
[5] e.g. Preventol G (Bayer)
[6] e.g. Antistaticum (Rhein Chemie), aluminium flake or sodium aluminium silicate
[7] e.g. Titanium dioxide
[8] e.g. Vulkacit J (Bayer)
[9] e.g. Diethylene glycol or triethanolamine The materials suitable for tires according to the invention will now be further described with the aid of three non-limiting Examples.

|  | Example 1 | Example 2 | Example 3 |
|---|---|---|---|
| Preferred compositions |  |  |  |
| NR | 100 | 50 | 100 |
| SP40 (SP rubber) | — | 50 | — |
| Ultrasil VN3 Silica (filler) | 40 | 40 | 40 |
| SI69 (rubber-filler coupling agent) | 5 | 4 | 3 |
| Struktol WB16 (process aid) | 4 | 4 | 4 |
| Zinc Oxide | 5 | 5 | 5 |
| Stearic Acid | 2 | 2 | 2 |
| Wingstay L (antioxidant) | 1 | 1 | — |
| Antioxidant 2246 | — | — | 1 |
| Preventol G (biocide) | 1 | 1 | 1 |
| Wax | 5 | 5 | 5 |
| Titanium dioxide (whitener) | 1 | 1 | — |
| Vulkacit J (accelerator) | 3.4 | 2.7 | — |
| Sulphur | — | — | 3.5 |
| N-cyclohexylbenzothiazole-2-sulphenamide (cross-linking accelerator) | — | — | 1.0 |
| Diethylene glycol (silica activator) | — | — | 1.5 |
| Physical Properties |  |  |  |
| Cure time min/150° C. | 60 | 60 | 35 |
| Density | 1.11 | 1.12 | 1.11 |
| Hardness, IRHD | 65 | 66 | 66 |
| DIN abrasion, mm$^3$ | 145 | 180 | 230 |
| M100, MPa | 2.7 | 2.3 | 2.6 |
| M300, MPa | 12.2 | 11.0 | 8.1 |
| TS, MPa | 25.5 | 26 | 26 |
| EB, % | 480 | 525 | 620 |
| Compression set, % |  |  |  |
| 3 days at 23° C. | 12 | 12 | 13 |
| 1 day at 70° C. | 15 | 18 | 28 |
| Trouser tear (ISO34), N/mm | 10 | 13 | 23 |
| Ring fatigue life, Kilocycles to failure 0–100% extension | 57 | 54 | 49 |
| Tension hysteresis, % | 10 | 15 | 11 |

M100 and M300 stand respectively for the modulus of elasticity at 100% and 300% extension, TS stands for tensile strength, and EB for extension to break point.

The following Table illustrates the improved performance characteristics of a wheelchair tire made according to the invention:

| Performance Characteristics Comparison | |
|---|---|
| a. Tire according to the invention, 60 cm dia. | b. Pneumatic Tire, 60 cm dia. |
| 1. MAINTENANCE | |
| a. Maintenance-free | b. 4.35 kg/cm$^2$ or 60 psig inflation pressure |
| 2. WEIGHT | |
| a. 880 grams (1.94 lbs) | b. 734 grams (1.62 lbs)(tire & tube) |
| 3. SKID MARKING | |
| a. Non-marking | b. Non-marking |
| 4. ROLLING RESISTANCE | |
| per tire (of 7.5% hysteresis rubber), 27.25 kg (60 lbs) load, 2.4–4.8 kph (1.5–3 mph) | |
| a. 265 grams (0.59 lb) | b. 263 grams (0.58 lbs) |
| 5. COEFF. OF FRICTION (CONCRETE FLOOR) | |
| a. 0.85 (dry or wet) | b. 0.65 |
| 6. TIRE SPRING CONSTANT [0–27.25 KG (0–60 LBS) LOAD] | |
| (low spring constant indicates good ride quality) | |
| a. 130 kg/cm or 730 lbs/inch | b. 124 kg/cm or 694 lbs/inch |
| 7. ROLL-OFF (12 deg. max) | |
| a. No | b. No |
| 8. ABRASIVE INDEX (WEAR RATE) | |
| Higher values = lower wear rate. | |
| a. 110 | b. 19 |
| 9. COMPRESSION SET (23° C.) | |
| a. 13% | b. 10.6% |
| 10. LIFE | |
| a. Exceeds life of wheelchair | b. 3 years (average puncture period) |

Note: the rolling resistance will vary in proportion to the hysteresis of the rubber.

TIRE TESTING

The current design of testing machine proposed as an international standard device consists of two rotating drums, one under the rear wheels and one under the front wheels. The drums have bump slats 10 mm high impacting the tires, and the drums are rotated about an off axis axle to twist the wheelchair frame.

Initial work with this machine by the applicants on non-pneumatic tires showed that the foamed polyurethane tires failed by crack propagation and chunking and cutting at an early life. It is believed that the very low fatigue endurance limit for foamed elastomers contributes mainly to this problem.

Tires according to the invention overcome the above problem by its very high fatigue endurance limit. In comparison to all other white rubber tire materials preferred compounds according to the invention show (1) less heat build-up, (2) higher endurance in service, (3) better tear, chipping, chunking and cutting properties, especially at elevated temperatures, and (4) higher modulus retention at elevated temperatures.

RUBBER COMPOUNDING

The preferred compounds use SI-69, a silane coupling agent that is a reinforcing agent for siliceous fillers developed by DEGUSSA, see Wolff, S., 'Theoretical & Practical Aspects of SI 69 Application in Tires', DEGUSSA AG, Paper 2148. This new agent solves the following problems usually associated with silica fillers: (a) Small additions of SI-69 reduces the compound viscosity to the same or lower level as compounds using carbon black; (b) The cure characteristics of SI-69 based compounds avoid reduction in cure rate and cross-linking density; and (c) at the same surface area as carbon blacks SI-69 promotes the erection of filler-to-rubber bonds which causes a strong increase in the in-rubber surface area of the silica filler comparable to values close to the in-rubber surface of N-220 carbon black.

We claim:

1. A non-pneumatic tire comprising a base for attachment to a vehicle wheel rim, side walls and a tread merging with one another, wherein:
    (a) the tire includes a single continuous encircling empty space between the said base and the said tread, said encircling empty space has a circular cross-sectional configuration;

(b) the size of the said encircling empty space is selected so as to result in a tire wall thickness providing a spring constant k in the range of 100 to 200 N/mm;

(c) the said tire contains reinforcing means to maintain the position of the tire on the wheel under substantially all operating conditions; and wherein (d) the said tread is of generally constant thickness along any radius of a tire cross-section taken from a center of said encircling empty space and the ratio of the moment of inertia of the said tread to that of the said side walls is within the range of 0.75 to 3.0.

2. A non-pneumatic tire according to claim 1, wherein the ratio of the moment of inertia of the said tread to that of the said side walls is substantially one.

3. A non-pneumatic tire according to claim 1, wherein said reinforcing means is selected from a group consisting of at least one encircling layer of cord and at least one encircling spiral wire.

4. A non-pneumatic tire according to claim 1, wherein the said reinforcing means is constituted by a wheel rim extension of T-shaped cross-section, with the stem of the T extending towards the said tread and the head of the T extending widthwise of the tire.

5. A non-pneumatic tire according to claim 1, wherein the tire material is extruded and vulcanized; the vulcanized tire material is cut to length and the ends joined together to produce a tire to be press-fitted to the said wheel rim.

6. A non-pneumatic tire according to claim 1, wherein the extruded material is fitted to a preformed wheel rim in a mould and the material and wheel are bonded during vulcanization in the mould.

7. A non-pneumatic tire according to claim 1, which is extruded as a hollow profile tire and vulcanized in a closed mould.

8. A tire as claimed in claim 3, wherein the location of said layer(s) of cord is selected from a group consisting of: the base of the tire and said encircling empty space of the tire.

9. A non-pneumatic tire according to claim 1, wherein the tire is made of rubber with the following composition: 100 parts of principal material, 30–60 parts filler, 0–6 parts rubber-filler coupling agent, 0–5 parts of process aid, 1–10 parts zinc oxide, 0–5 parts stearic acid, 0–3 parts antioxidant, 0–10 parts wax, 0–3 parts biocide, 0–20 parts antistatic agent, 0–20 parts whitening agent, 0.3–4.0 parts accelerator, 0–4 parts sulphur and 0–3 parts silica activator, wherein said principal material is selected from the group consisting of natural rubber, a synthetic rubber, a superior processing rubber, and a mixture of these rubbers.

10. A non-pneumatic tire according to claim 1, wherein said tread and said side wall are of generally constant thickness along any radius of a tire cross-section.

* * * * *